US010090895B2

(12) United States Patent
Pefkianakis (10) Patent No.: US 10,090,895 B2
(45) Date of Patent: *Oct. 2, 2018

(54) ADAPTIVE SOUNDING IN WIRELESS NETWORKS

(71) Applicant: Hewlett Packard Enterprise Development LP, Houston, TX (US)

(72) Inventor: Ioannis Pefkianakis, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,724

(22) Filed: Dec. 18, 2017

(65) Prior Publication Data

US 2018/0212654 A1 Jul. 26, 2018

Related U.S. Application Data

(63) Continuation of application No. 15/411,042, filed on Jan. 20, 2017, now Pat. No. 9,853,701.

(51) Int. Cl.
| | |
|---|---|
| *H04B 7/04* | (2017.01) |
| *H04B 7/0452* | (2017.01) |
| *H04B 7/0417* | (2017.01) |
| *H04B 7/06* | (2006.01) |

(52) U.S. Cl.
CPC ......... *H04B 7/0452* (2013.01); *H04B 7/0417* (2013.01); *H04B 7/0617* (2013.01); *H04B 7/0626* (2013.01)

(58) Field of Classification Search
CPC .. H04B 7/0452; H04B 7/0417; H04B 7/0617; H04B 7/0626
See application file for complete search history.

(56) References Cited

U.S. PATENT DOCUMENTS

| | | | |
|---|---|---|---|
| 8,804,612 B1 | 8/2014 | Chen et al. | |
| 9,184,511 B2* | 11/2015 | Ma | H01Q 25/00 |
| 2011/0237282 A1 | 9/2011 | Geirhofer et al. | |
| 2011/0274002 A1* | 11/2011 | Pare, Jr. | H04B 7/0452 |
| | | | 370/252 |

(Continued)

OTHER PUBLICATIONS

Weihong Fu and Boyu Chen, "Research and Simulation of Beamforming Algorithms in the TD-LTE System," Sep. 2011, pp. 1-4, Xidian University, Xian, China.

*Primary Examiner* — Freshteh N Aghdam
(74) *Attorney, Agent, or Firm* — Hewlett Packard Enterprise Patent Department (57) ABSTRACT

An example communications device includes communications circuitry and control circuitry. The communications circuitry may wirelessly communicate with multiple receiver antennas concurrently via multiple transmit antennas. The control circuitry may execute an adaptive sounding process that may include, for each client connected to the communications device, performing a follow-up sounding for the client in response to determining that all of the following conditions are jointly satisfied: (a) a wireless channel of the client has significantly changed, as determined based on a channel correlation metric; (b) a wireless throughput has significantly decreased, as determined based on a throughput gradient metric; and (c) the client had a significant amount of recent traffic, as determined based on a traffic metric.

14 Claims, 6 Drawing Sheets

(56) References Cited

U.S. PATENT DOCUMENTS

| | | |
|---|---|---|
| 2014/0192914 A1 | 7/2014 | Liu et al. |
| 2014/0219111 A1* | 8/2014 | Du .................. H04W 24/02 370/252 |
| 2015/0117325 A1 | 4/2015 | Ponnuswamy |
| 2015/0333894 A1* | 11/2015 | Wang .................. H04L 5/0073 370/329 |
| 2016/0036572 A1 | 2/2016 | Bhanage et al. |
| 2016/0254884 A1 | 9/2016 | Hedayat et al. |
| 2016/0295513 A1 | 10/2016 | Moon et al. |
| 2016/0301452 A1* | 10/2016 | Kwon .................. H04B 7/0421 |

* cited by examiner

Fig. 6

ADAPTIVE SOUNDING IN WIRELESS NETWORKS

This application is a Continuation of U.S. application Ser. No. 15/411,042 filed on Jan. 20, 2017, the content of which are incorporated herein by reference n its entirety. The Applicant hereby rescinds any disclaimer of claim scope in the parent application or the prosecution history thereof and advices the USPTO that the claims in this application may be broader than any claim in the parent application.

BACKGROUND

Various wireless communications techniques may utilize beamforming to transmit signals via multiple transmitter antennas, thereby increasing the throughput of the system (see, for example, IEEE 802.11n, IEEE 802.11ac, IEEE 802.16e, IEEE 802.16m, LTE Advanced, etc.). For example, a wireless communications device (such as a wireless access point) may transmit a single data stream via multiple transmitter antennas. As another example, a wireless communications device may transmit multiple distinct data streams concurrently to multiple receiver antennas via multiple transmitter antennas—an approach referred to as Multiple-Input-Multiple-Output (MIMO). A communications device that utilizes beamforming to transmit wireless signals may be referred to as a beamformer.

Beamforming involves varying parameters (such as the phase or amplitude) of the individual signals transmitted by the multiple antennas, so as to manipulate the combined radiation pattern that is emitted by the antennas in some desired way. Certain MIMO techniques may utilize a particular form of beamforming known as precoding, which is characterized by having multiple distinct data streams that are transmitted with independent weightings (as opposed to transmitting the same data stream from each antenna). The parameter variations (e.g., the weightings) that are applied to the signals may be represented in a matrix, which may be referred to as a steering matrix. The beamformer and/or the client device may compute a steering matrix that will produce some desired result (e.g., optimize throughput), and the beamformer may apply the steering matrix to the signals that are to be transmitted.

MIMO techniques include Single-User MIMO (SU-MIMO) and Multi-User MIMO (MU-MIMO). In SU-MIMO techniques, multiple data streams may be transmitted concurrently on the same frequency channel to a single client device via multiple transmitter antennas, the combined signal may be received at multiple receiver antennas of the client device, and the client device may differentiate the data streams from the combined by exploiting knowledge of the wireless channel. In MU-MIMO techniques, multiple data streams may be transmitted concurrently on the same frequency channel to multiple client devices via multiple transmitter antennas, the combined signal may be received at each of the client devices, and the client devices may each recover their intended data stream from the combined signal by exploiting knowledge of the wireless channel.

DETAILED DESCRIPTION

A beamformer (e.g., an 802.11 access point) utilizing beamforming techniques may sound a client device to obtain information from the client device, such as channel state information. Sounding entails a beamformer sending a sounding request (or command) to a client device, with the client device sending certain information back to the beamformer in response to receiving the sounding request. Sounding enables the beamformer to collect information from client devices that may be used to compute a steering matrix. An initial sounding operation may be performed when a client newly joins (or rejoins) the network.

Because conditions may change as time goes on, the steering matrix that was determined based on the initial sounding may eventually produce subpar results. Thus, to ensure that the desired level of performance is maintained over time, follow-up soundings may be performed after the initial sounding to capture changing conditions, and the steering matrix may be updated based on the follow-up soundings. Updating the steering matrix as a result of a follow-up sounding may improve the performance of the network (e.g., increasing signal-to-noise ratio (SNR) at one or more clients), since the updated steering matrix may be better than the previous steering matrix in view of current conditions. Generally, the size of the performance gain that results from updating the steering matrix will vary depending on the state of the network when the sounding is performed, with the largest performance gains coming when network conditions have significantly changed since the last sounding and the smallest performance gains coming when network conditions have changed little since the last sounding.

If follow-up soundings were cost free in terms of throughput, then the performance gains resulting from updating the steering matrix would always tend to improve the aggregate throughput of the network and each follow-up sounding would be beneficial. However, follow-up soundings are not cost free in terms of throughput—specifically, each sounding operation entails some signaling overhead. In particular, while signals are being exchanged between the beamformer and a client as part of a sounding operation, user data is not being communicated.

Thus, whether or not a particular sounding is beneficial or detrimental in terms of its net effect on aggregate throughput depends on whether the performance gains that result from updating the steering matrix at that particular time outweigh the cost of the signaling overhead. Since the performance gains associated with soundings vary depending on the circumstances when they are performed, certain soundings performed at some timings may have a net-positive effect on throughput while soundings performed at other timings may have a net-negative effect on throughput. A sounding whose signing overhead outweighs the performance gain resulting from updating the steering matrix (i.e., a sounding with a net-negative effect on throughput) is referred to herein as a "wasteful sounding".

In examples disclosed herein, an example adaptive sounding process is used to control when follow-up soundings are performed. In particular, in certain examples, follow-up soundings are performed for a client whenever all of the following conditions are jointly satisfied: a) a wireless channel of the client has significantly changed, b) a wireless throughput of the client has significantly decreased, and c) the client had a significant amount of recent traffic. Moreover, in certain examples follow-up soundings for a client may be abstained from (prevented) whenever the three conditions (a)-(c) noted above are not jointly satisfied (i.e., when any one of the conditions (a)-(c) is not satisfied).

In general, if circumstances are such that the three conditions (a)-(c) are jointly satisfied, it is highly likely that updating the steering matrix in those circumstances would provide performance gains that outweigh the signaling overhead associated with a follow-up sounding. Conversely, if any one of the conditions (a)-(c) is not satisfied, then it is highly likely that the signaling overhead associated with performing a follow-up sounding would tend to outweigh the performance gains that would result from updating the steering matrix. Thus, by performing the follow-up soundings when the conditions (a)-(c) are satisfied and abstaining from follow-up soundings when one of the conditions (a)-(c) is not satisfied, almost every opportunity for significantly improving throughput by sounding will be taken advantage of and wasteful soundings may be virtually eliminated.

To see why it may be beneficial in certain examples for all of the conditions (a)-(c) to jointly be satisfied before a follow-up sounding is performed, consider the following example scenarios in which one or more of the conditions (a)-(b) is not satisfied. For example, if the channel of a client has not significantly changed (e.g., condition (a) is not satisfied), then one would not expect the steering matrix to change very much when it is updated, and therefore one would not expect much of a performance gain from the update. Since the likely performance gain resulting from performing a sounding when condition (a) is not satisfied is small, it is likely that the signaling overhead of the sounding will outweigh the performance gains. Thus, follow-up soundings performed when condition (a) is not satisfied are likely to be wasteful soundings.

As another example, even if the channel of a client has significantly changed (e.g., condition (a) is satisfied), if the changes were of such a nature that they did not degrade the throughput of the client (e.g., condition (b) is not satisfied), then updating the steering matrix is unlikely to improve the throughput of the client very much, much less the aggregate throughput of the network. In particular, because the client's throughput did not significantly degrade as a result of the channel state changes, there is likely to be little room left for throughput improvement. Thus, although a sounding may produce non-trivial changes to the steering matrix (since channel conditions have significantly changed), these changes to the steering matrix may be largely ineffectual with regard to improving throughput. Therefore the signaling overhead of the sounding is again likely to outweigh any performance gains from the sounding benefits. Thus, follow-up soundings performed when condition (b) is not satisfied are likely to be wasteful soundings.

As another example, even if the channel of the client has significantly changed and the clients throughput has degraded (e.g., conditions (a) and (b) are satisfied), if the client does not have much traffic (e.g., condition (c) is not satisfied), updating the steering matrix is unlikely to improve the aggregate throughput of the network very much. In particular, updating the steering matrix is likely to improve the particular client's link, since conditions (a) and (b) are both satisfied; however, because the client's traffic is low, this improvement in the client's link is not likely to improve aggregate throughput much. In particular, the low amount of traffic for the particular client implies that the client's impact on aggregate throughput is minimal, and thus even large throughput gains for the particular client may translate into minimal aggregate throughput gains for the network. Thus, follow-up soundings performed when condition (c) is not satisfied are likely to be wasteful soundings.

In addition to virtually eliminating wasteful soundings and taking advantage of opportunities to improve throughput, the example adaptive sounding processes described herein may also significantly reduce sounding lag, where "sounding lag" refers to a delay between a timing when a significant network change occurs (i.e., a change for which the benefits of updating the steering matrix would offset the overhead of sounding) and the timing that the next sounding is performed. In particular, because performance of the sounding is specifically triggered by conditions (a)-(c) being jointly satisfied, there is very little lag between the significant change and the performance of the sounding.

The example adaptive sounding processes described herein may be more likely to improve throughput of the network than, for example, an approach in which follow-up soundings are performed periodically (i.e., repeatedly with a specified time interval between each follow-up sounding). In particular, approaches in which soundings are performed periodically may result in numerous wasteful soundings and substantial sounding lag, whereas the example adaptive sounding processes described herein may virtually eliminate wasteful soundings and may reduce sounding lag to negligible levels. Specifically, when follow-up soundings are performed periodically, some follow-up soundings may occur at timings when conditions have changed little since the last sounding, and thus the performance gain associated with such a sounding may be minimal and is unlikely to outweigh the signaling overhead (i.e., it is a wasteful sounding). The shorter the sounding period is, the more likely it is that a sounding will occur at a timing when conditions have changed little since the last sounding. Thus, the shorter the sounding period is the more wasteful soundings there are likely to be. Furthermore, when follow-up soundings are performed periodically, if conditions change for the worse between sounding periods, then the next sounding does not occur until the next sounding period (i.e., sounding lag occurs). During the span of time from the change in conditions to the next sounding period, the throughput of the network may suffer. The longer the sounding period is, the longer the average duration of such sounding lag. Thus, in approaches in which soundings are performed periodically, there is a trade-off between having a shorter sounding period (which may produce more wasteful soundings) and having a longer sounding period (which may produce longer average sounding lag).

One approach to mitigate these potential drawbacks of periodic sounding may be to dynamically change the period at which follow-up soundings are performed based on monitored criteria (such as the channel state), for example sounding more frequently under some conditions and less frequently under others. However, while such an approach may reduce the number of wasteful soundings that occur and may reduce the average duration of sounding lag, because the soundings still occur periodically such an approach is unlikely to eliminate wasteful soundings entirely or reduce the duration of sounding lag to a negligible level. In contrast, the example adaptive sounding processes described herein may virtually eliminate wasteful soundings and may reduce average sounding lag to negligible levels.

[Example System]

Figure 1:
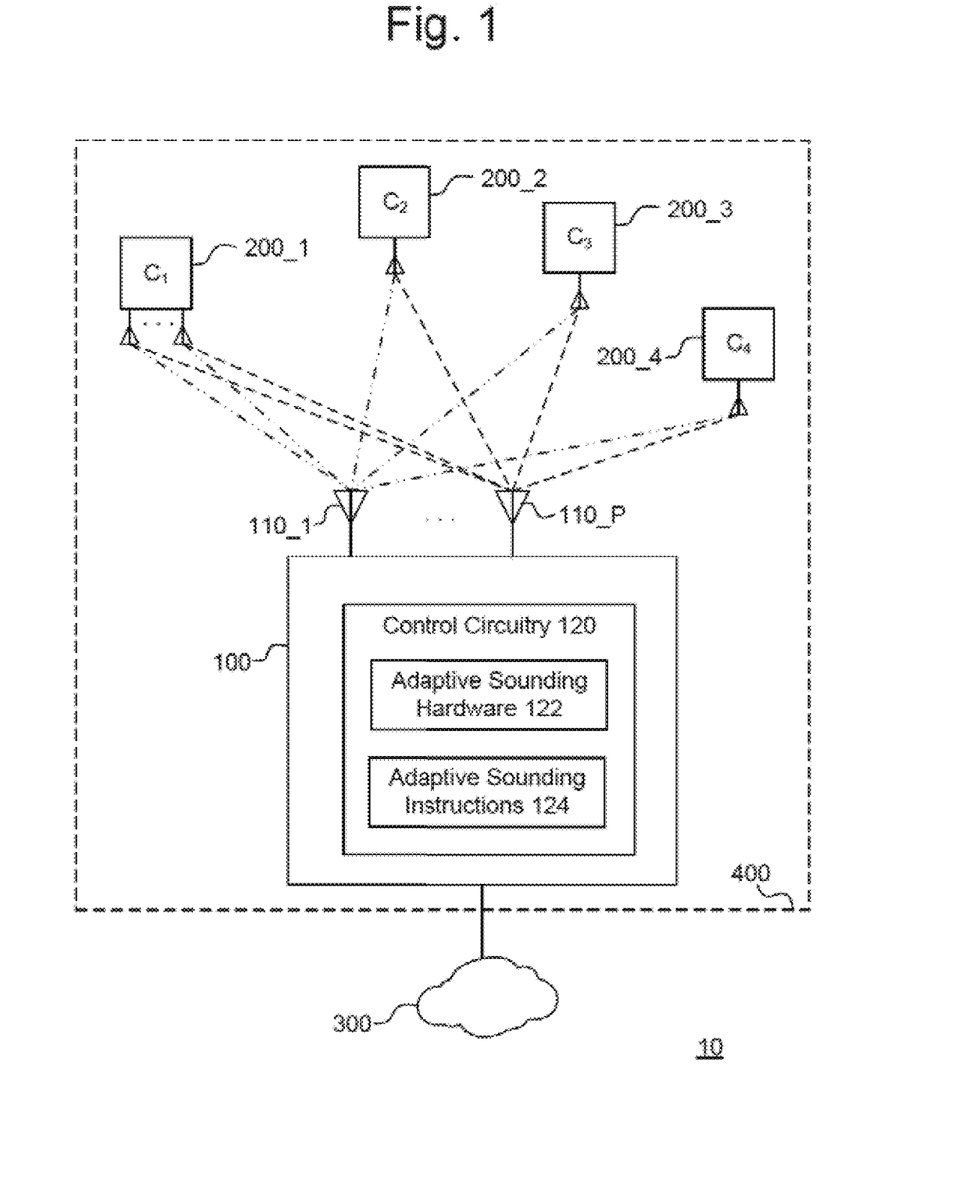
FIG. 1 is a conceptual diagram illustrating an example system comprising a communications device, client devices, and an external network.

FIG. 1 illustrates an example system 10. The example system 10 includes a communications device 100, client devices 200 (e.g., client devices 200_1-200_4), and an external network 300. The communications device 100 utilizes beamforming techniques to wirelessly communicate with the client devices 200, and may act as an access point to the external network 300. In particular, the communications device 100 includes control circuitry 120 that may cause the communications device 100 to perform certain operations described herein. Specifically, the control circuity 120 may include adaptive sounding hardware 122, which may control sounding timings by performing an adaptive sounding process. In certain examples, the adaptive sounding hardware 122 may be formed (in whole or in part) by a processor executing adaptive sounding instructions 124. The communications device 100 may be, for example, a Wi-Fi access point (such as an IEEE 802.11ac access point), a cellular communications base station (such as an eNodeB in a Long Term Evolution (LTE) network), a WiMAX base station (such as an IEEE 802.16e base station), and the like. The network 300 may be any wired or wireless network, such as, for example, a local area network (LAN), a wide area network (WAN), the internet, a telecommunications backhaul network (such as an Evolved Universal Mobile Telecommunications System Terrestrial Radio Access Network (E-UTRAN) in an LTE network), a telecommunications core network (such as an Evolved Packet Core in an LTE network), and so on. The communications device 100 and client devices 200 that are connected thereto may be referred to herein as a wireless network 400.

[Example Communications Device]

Figure 2:
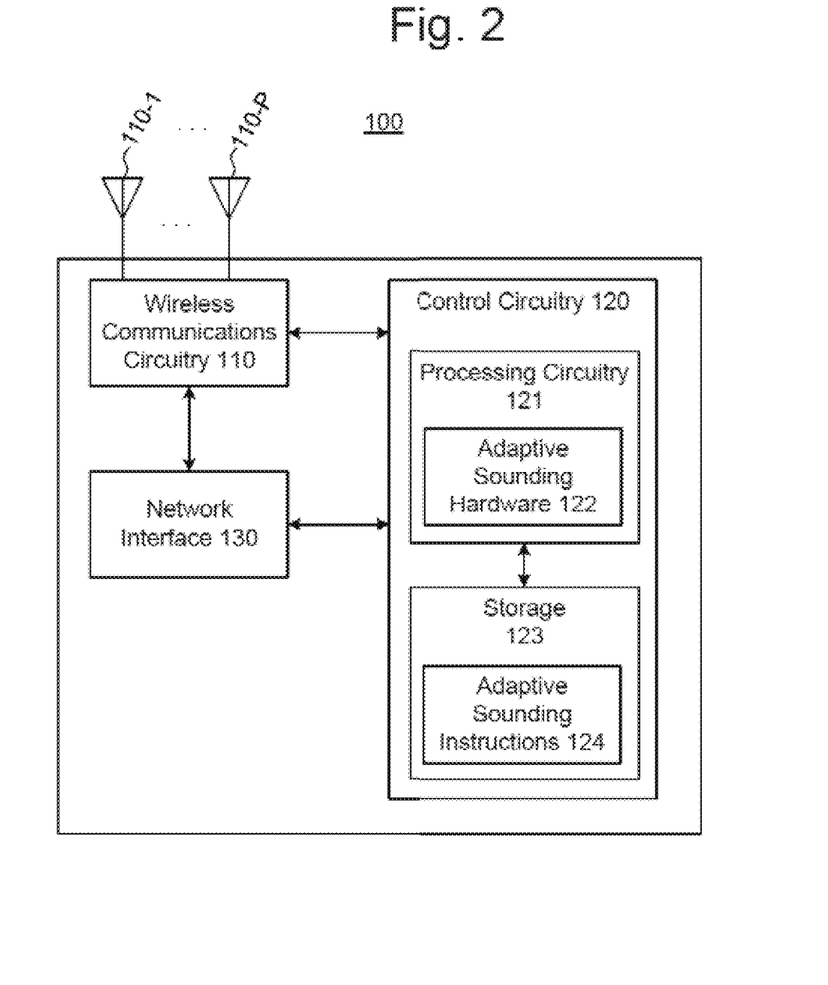
FIG. 2 is a conceptual diagram illustrating an example communications device.

FIG. 2 illustrates an example communications device 100. The communications device 100 includes wireless communications circuitry 110, control circuitry 120, and a network interface 130. The wireless communications circuitry 110 may use beamforming techniques to wirelessly transmit messages to the client devices 200. The wireless communications circuitry 110 may also receive messages wirelessly transmitted from the client devices 200. The network interface 130 may connect the communications device 100 to a network, such as the network 300. The control circuity 120 may control the wireless communications circuitry 110. The control circuitry 120 may also control the network interface 130.

The wireless communications circuitry 110 includes antennas 110-1 through 110-P, where P is an integer equal to or greater than two. The antennas 110-1 through 110-P may transmit and/or receive signals in the form of electromagnetic radiation. Any portion of the electromagnetic spectrum may be used to transmit/receive messages. A transport protocol adopted by the communications device 100 may specify a particular portion of the electromagnetic spectrum for transmission/reception (for example, IEEE 802.11ac specifies a 5 Ghz band). The wireless communications circuitry 110 may transmit up to P distinct transmission streams concurrently via the antennas 110-1 through 110-P, using SU-MIMO and/or MU-MIMO techniques. The wireless communications circuitry 110 may also transmit a single transmission stream concurrently via the antennas 110-1 through 110-P. The wireless communications circuitry 110 may generate the transmission streams by packaging messages that are to be transmitted into transmission frames (e.g., MAC and PHY framing) according to the wireless transmission protocol adopted by the communications device 100, mapping the transmission frames to transmission symbols according to a modulation scheme and modulating a carrier signal based on the transmission symbols, and wirelessly transmitting the modulated signals via amplifiers and the antennas 110-1 through 110-P. Examples of wireless transmission protocols include IEEE 802.11, IEEE 802.16, 3GPP E-UTRA, and the like. Examples of modulation schemes include quadrature amplitude modulation (QAM), phase-shift keying (PSK), frequency-shift keying (FSK), amplitude-shift keying (ASK), frequency-division multiplexing (FDM), orthogonal frequency-division multiplexing (OFDM), continuous phase modulation (CPM), and the like. Some wireless transmission protocols specify use of a particular modulation schemes; for example, IEEE 802.11ac specifies use of QAM modulation. The wireless communications circuitry 110 may include circuitry for generating the carrier signal such as an oscillator, a modulator for modulating the carrier signal, filters, amplifiers, and the like. The wireless communications circuitry 110 may also include precoding circuitry that applies weights to the P signals using beamforming techniques. The precoding weights may be determined by the control circuitry 120. The wireless communications circuitry 110 may also receive wireless transmissions from client devices via the antennas 110-1 through 110-P, and may demodulate the received signals via demodulation circuitry to obtain reception frames. Reception frames whose payload is intended to go to the network 300 (e.g., data plane messages) may be sent to the network 300 via the network interface 130, while reception frames that include control plane messages may be sent to the control circuitry 120 for processing.

The control circuity 120 may include any combination of hardware and stored machine-readable instructions. In particular, the control circuitry 120 may include processing circuitry 121, which may be any combination of circuitry that is configured to perform the operations that are described herein in connection with the control circuitry 120. In particular, the processing circuitry 121 may include one or more processors that are capable of executing machine-readable instructions, such as central processing units (CPUs), microprocessors, microcontrollers, digital signal processors (DSPs), field-programmable gate arrays (FPGAs), application-specific instruction set processors (ASIPs), etc. The processing circuity 121 may be formed (in whole or in part) by such a processor executing machine-readable instructions. Such machine readable instructions may be stored, for example, in the storage 123. The processing circuitry 121 may also include dedicated circuity to perform one, some, or all of the operations described herein in connection with the control circuitry 120. Examples of such dedicated circuitry may include application-specific integrated circuits (ASICs), complex programmable logic devices (CPLD), and so on.

The processing circuitry 121 may include adaptive sounding hardware 122 that is configured to cause the communications device 100 to perform one or more of the operations described herein in connection with an adaptive sounding process. In certain examples, the adaptive sounding hardware 122 may be formed (in whole or in part) by a processor of the processing circuity 121 that is executing adaptive sounding instructions 124. Such adaptive sounding instructions 124 may be stored, for example, in the storage 123.

Some or all of the adaptive sounding hardware 122 may also be formed by dedicated circuitry of the processing circuitry 121.

The storage 123 may be any non-transitory machine readable medium, which may include volatile storage media (e.g., DRAM, SRAM, etc.) and/or non-volatile storage media (e.g., PROM, EPROM, EEPROM, NVRAM, flash, hard drives, optical disks, etc.). The storage 123 may store machine-readable instructions, which may include adaptive sounding instructions 124. The adaptive sounding instructions 124 may be such that they, when executed by the processing circuitry 121, cause the control circuitry 120 to perform the operations described herein in connection with an adaptive sounding process, such as the operations described in relation to FIGS. 3 and 4. In examples in which the adaptive sounding hardware 122 is constituted entirely by dedicated circuitry, the storage 123 and the adaptive sounding instructions 122 may be omitted.

The control circuitry 120 may control the operations of the wireless communications circuitry 110 and/or the network interface 130. The control circuitry 120 may also determine precoding weights to be applied to the transmission streams based on beamforming techniques. For example, each client device 200 may send to the communications device 100 beamforming feedback that includes information describing the state of the client device 200's channel, and the control circuitry 120 may use the beamforming feedback to generate a steering matrix (which is an example of the preceding weights). The steering matrix may then be applied to the transmission streams. The control circuitry 120 may also generate control plane messages to be sent to client devices 200 via the wireless communications circuitry 110, and may process control plane messages received from client devices 200.

The network interface 130 connects the communications device 100 to a network, such as the network 300. The network interface 130 includes at least one communications port that is connectable to the network, and may pass data between the wireless communications circuitry 110 and the network via the communications port. The network interface 130 may act as a hub, a bridge, a switch, a router, etc.

While the wireless communications circuitry 110, the control circuitry 120, and the network interface 130 are illustrated/described separately, this is merely for ease of explanation and does not imply that these components are necessarily physically or logically separated. For example, the wireless communications circuitry 110 and the control circuitry 120 may share one or more of same processors and/or ASICs, such as a wireless transceiver chipset, and they may overlap with one another physically and/or functionally. Moreover, a particular operation may appropriately be described as being performed simultaneously by both the wireless communications circuitry 110 and the control circuitry 120, since the control circuitry 120 may control the wireless communications circuitry 110. For example, the wireless communications circuitry 110 may be said to modulate a carrier signal because it physically alters a parameter of the carrier signal, but the control circuitry 120 may also be said to modulate the carrier signal because it controls the wireless communications circuitry 110 in the modulation.

[Example Adaptive Sounding Processes]

An example adaptive sounding process may be used to determine timings at which follow-up soundings should be performed. As used herein, a "follow-up sounding" is any sounding that is performed except a sounding that is performed in response to (or as part of) a client connecting (or reconnecting) to the network. In general, the decision to perform a follow-up sounding is made on a per-client basis.

According to one example adaptive sounding process, a follow-up sounding is performed for a client in response to determining that all of the following conditions are jointly satisfied: a) a wireless channel of the client has significantly changed, b) a wireless throughput of the client has significantly decreased; and c) the client had a significant amount of recent traffic. In certain examples, follow-up soundings for a client may be abstained from (prevented) whenever the three conditions (a)-(c) noted above are not jointly satisfied (i.e., when any one of the conditions (a)-(c) is not satisfied).

Figure 3:
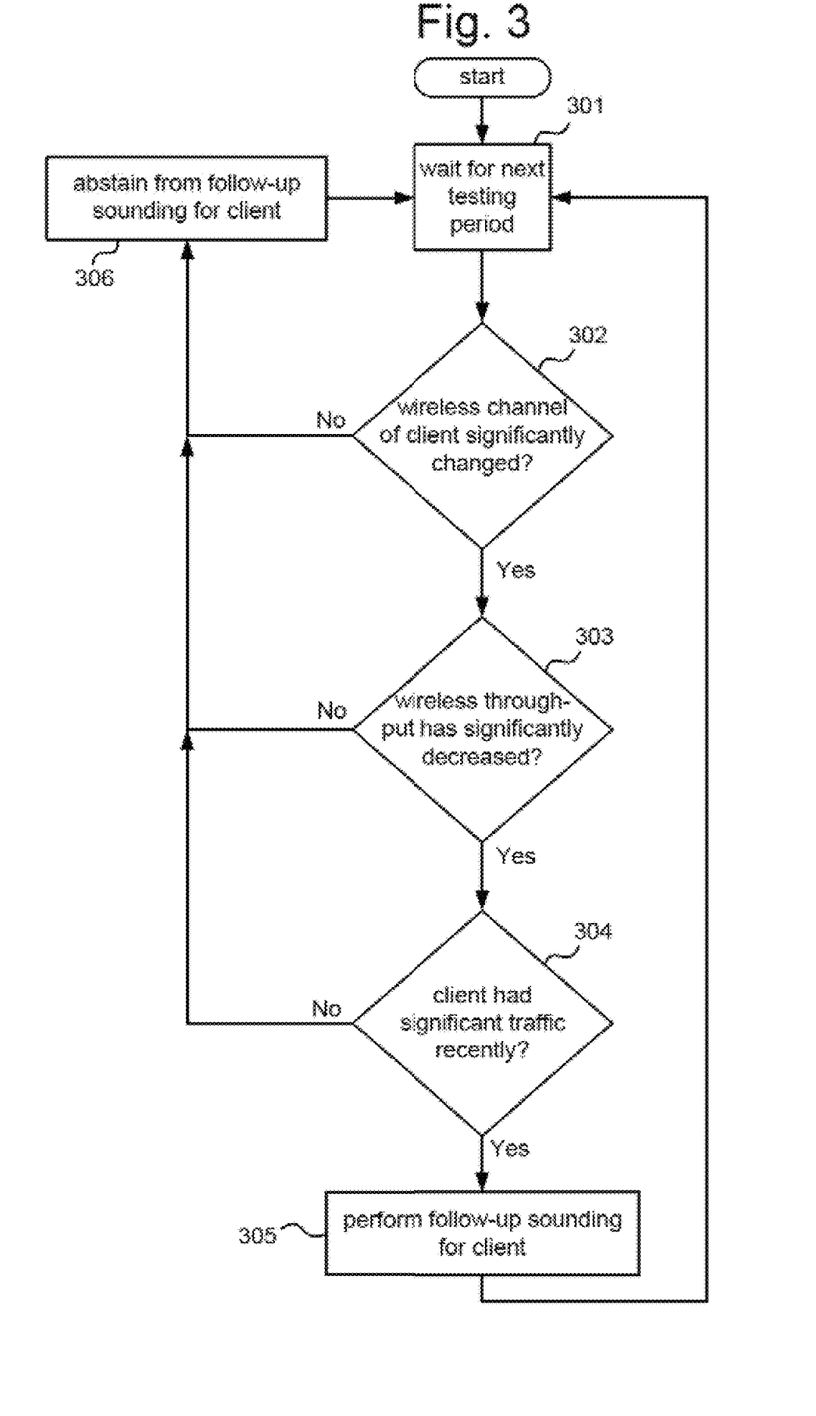
FIG. 3 is a process flow diagram illustrating an example adaptive sounding process.

For example, FIG. 3 illustrates an example adaptive sounding process. The process of FIG. 3 may be performed by a beamformer (such as the communications device 100) for each client device connected to the beamformer.

In block 301, the next testing period is waited for. Once the next testing period arrives, the process continues to block 302.

In block 302, it is determined whether the wireless channel of the client device has significantly changed. In other words, the condition (a) is tested. If the wireless channel has significantly changed (i.e., condition (a) is satisfied), then the process continues to block 303. If the wireless channel has not significantly changed (i.e., condition (a) is not satisfied), then the process proceeds to block 306.

In block 303, it is determined whether the wireless throughput of the client device has significantly decreased. In other words the condition (b) is tested. If the throughput has significantly decreased (i.e., condition (b) is satisfied), then the process continues to block 304. If the throughput has not significantly decreased (i.e., condition (b) is not satisfied), then the process proceeds to block 306.

In block 304, it is determined whether the client has had significant traffic recently. In other words, the condition (c) is tested. If the client has had significant traffic recently (i.e., condition (c) is satisfied), then the process continues to block 305. If the client has not had significant traffic recently (i.e., condition (c) is not satisfied), then the process continues to block 306.

In block 305, a follow-up sounding is performed for the client. Block 305 is reached if each of the blocks 302-304 is answered yes. In other words, block 305 is reached if the conditions (a)-(b) are jointly satisfied.

In block 306, follow-up soundings for the client device are abstained from (prevented). Block 306 is reached if any one of blocks 302-304 is answered no. In other words, block 306 is reached if any one of the conditions (a)-(b) is not satisfied.

In the process of FIG. 3, the conditions (a)-(b) are tested serially. For example, the conditions may be tested in a particular order and each condition is tested only if the previous condition was satisfied. In the example of FIG. 3, the order of testing is condition (a) first, then condition (b), and then condition (c). However, the order in which the conditions are tested could be changed to any order.

Moreover, in certain examples the conditions (a)-(c) may be tested logically in parallel. In this context, testing "logically in parallel" refers to a scheme in which the testing of one condition does not necessarily depend on whether another of the conditions was first satisfied. The use of the word "logically" in this context is meant to distinguish "logically in parallel" from usages of "in parallel" that refer to chronological simultaneity. In particular, testing the conditions (a)-(c) "logically in parallel" would include testing the conditions (a)-(c) at the same time (chronologically in parallel), but is not limited to testing the conditions (a)-(c) at the same time.

Figure 4:
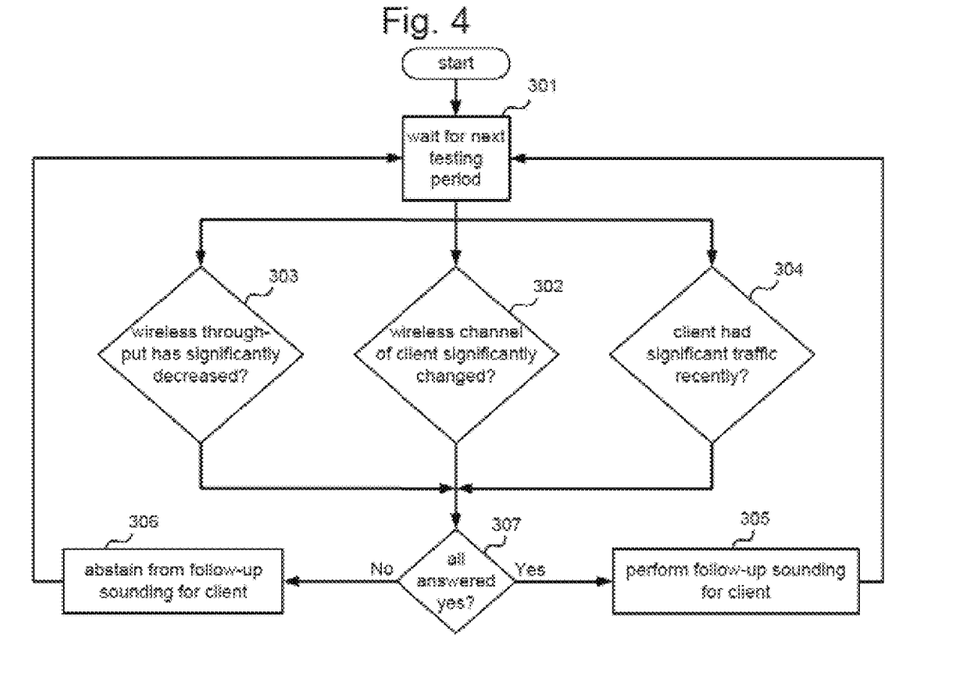
FIG. 4 is a process flow diagram illustrating another an example adaptive sounding process.
Figure 5:
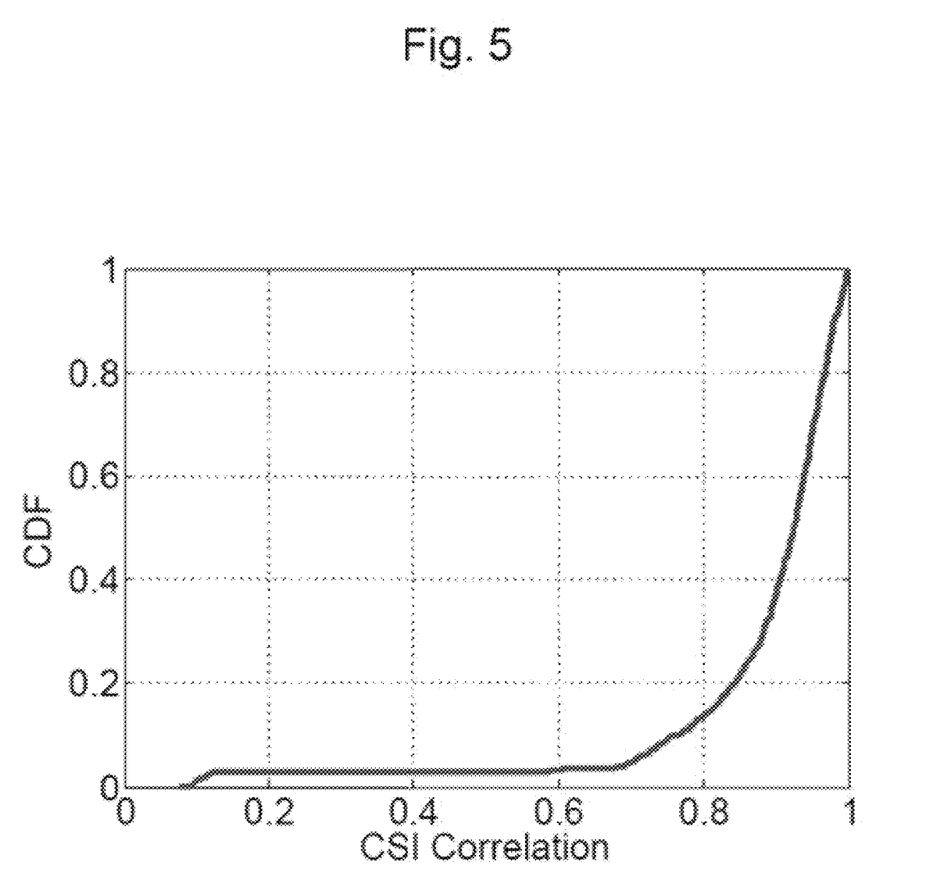
FIG. 5 is a graph of an example cumulative distribution function of channel correlation metrics for pairs of channel state information samples measured over a period of time in a stable channel environment.

For example, FIG. 4 illustrates an example adaptive sounding process in which the conditions (a)-(c) are tested logically in parallel. Some of the blocks in FIG. 4 are identical to blocks in FIG. 3, and duplicative descriptions of such blocks will be omitted.

Similar to FIG. 3, in FIG. 4, the process starts at block 301. However, unlike FIG. 3, in FIG. 4 after block 301 the process proceeds to each of the blocks 302-304 logically in parallel, rather than proceeding through the blocks 302-304 in series. Specifically, after block 301 each of the blocks 302-304 may be performed regardless of whether or not another one of the blocks 302-304 is first answered yes. In certain examples, the blocks 302-304 may also be performed chronologically in parallel (i.e., at the same timing as one another). In other examples, some or all of the blocks 302-304 may be performed chronologically in series although logically in parallel.

After all of the determinations of blocks 302-304 have been made, the process continues to block 307. In block 307 it is determined whether all of the determinations in blocks 302-304 were yes (i.e., whether all of the conditions (a)-(c) were satisfied). If all of the answers to blocks 302-304 were yes (i.e., all of the conditions (a)-(c) are satisfied), then the process continues to block 305. If any of the answers to blocks 302-304 were no (i.e., any of the conditions (a)-(c) was not satisfied), then the process continues to block 306.

In both the example process of FIG. 3 and the example process of FIG. 4, the follow-up sounding is performed (i.e., block 305 is reached) if all of the conditions (a)-(c) are jointly satisfied. Moreover, in the example process of FIG. 3 and the example process of FIG. 4, the follow-up sounding is not performed (i.e., block 306 is reached), if any one of the conditions (a)-(c) is not satisfied.

[Condition (a)—Significant Change in Wireless Channel]

Recall that condition (a) is: a wireless channel of the client has significantly changed. Satisfaction of the condition (a) may be determined based on a channel correlation metric. The channel correlation metric may be any metric that quantifies a correlation between a current state of the client's channel and a prior state of the client's channel. More specifically, the channel correlation metric may be any metric that quantifies a correlation between a current channel-state-information (CSI) sample associated with the client and a prior CSI sample associated the client. As used herein, the wireless channel of the client has "significantly changed" if the channel correlation metric is less than (or less-than-or-equal-to) a pre-specified threshold.

In general, a beamformer (such as the communications device 100) may occasionally collect CSI samples as part of its normal operation, for purposes other than the adaptive sounding process. Such already-existing CSI samples may be used in determining the channel correlation metric. By leveraging the existing CSI samples, the determining of the channel correlation metric might impose minimal additional processing requirements on the beamformer. For example, in certain MU-MIMO networks, the beamformer may occasionally determine channel matrices $H_i(s)$ for a client, where i indicates the time period and s indicates a sub-carrier, and a CSI sample for the $i^{th}$ time period may be given by the set $C_i$ that includes all of the channel matrices $H_i(s)$ for the $i^{th}$ time period (i.e., $C_i=\{H_i(s)\}$). In certain examples, the CSI samples may be processed to remove or reduce noise prior to being used in determining the channel correlation metric. For example, a locally weighted scatterplot smoothing (LOWESS) filter may be applied to the CSI samples to smooth outliers.

In certain examples, the channel correlation metric may be given by the value $\rho(i,j)$:

$$\rho(i,j) = \frac{\sum_s \|H_i(s)H_j^H(s)\|}{\sqrt{\sum_s \|H_i(s)\|^2}\sqrt{\sum_s \|H_j(s)\|^2}} \quad \text{(eq. 1)}$$

where $H_i(s)$ is the channel matrix for the subcarrier s at time i, and $H^H$ refers to the Hermitian transpose of H. The time i is the current time period (or the most recent time period for which $H_i$ is available), while the time period j is a prior time period. The value $\rho(i,j)$ quantifies a correlation between a current CSI sample $C_i=\{H_i(s)\}$ and a prior CSI sample $C_j=\{H_j(s)\}$. For example, the prior time period j may be a time period associated with a most recently performed sounding operation (e.g., the time period immediately following the sounding). As another example, the time period j may be the time period that is a fixed number of time periods prior to the time period i; in other words, j=i−n, where n is some constant. A value of $\rho(i,j)$ equal to 1 indicates that the channel state has not changed at all between time j and time i, whereas a value of $\rho(i,j)$ close to 0 indicates that the channel has changed drastically.

When the channel correlation metric is given by the value $\rho(i,j)$, then the wireless channel of the client may be considered to have "significantly changed" if $\rho(i,j)$ is less than (or less-than-or-equal-to) a specified threshold value. Thus, for example, the condition (a) may be tested by testing $\rho(i,j)<R$, where R is a specified threshold.

R may be set to any value between 0 and 1. For example, a value of R that is based on a desired level of confidence may be determined experimentally by taking CSI samples in an environment where the channel has not changed, determining a cumulative distribution function of $\rho(i,j)$ based on the CSI samples, and determining the value of $\rho$ for which the cumulative distribution function equals the desired level of confidence. For example, if a desired confidence level is 80% (i.e., in cases in which there is no channel change, $\rho(i,j)>R$ at least 80% of the time), then, based on experiments conducted by the inventors, a value of R=0.85 may be used. Specifically, FIG. 3 shows a cumulative distribution function (CDF) of $\rho(i,j)$ for CSI samples, collected from 802.11ac commodity devices, across multiple controlled settings, in a time window of 0.5 msecs, of stable multipath environment (with no channel changes). From this, it is observed that for 80% of the cases, $\rho(i,j)>0:85$ when there is no significant channel change.

[Condition (b)—Throughput Significantly Degraded]

Recall that condition (b) is: a wireless throughput of the client has significantly decreased. Satisfaction of the condition (b) may be determined based on a throughput gradient metric. The throughput gradient metric may be any metric that quantifies a change in throughput of a given client over a period of time. More specifically, the throughput gradient metric may be any metric that quantifies a difference between a throughput metric $Thr_i$ of the client associated with a current timing (or most recent timing) and a throughput metric $Thr_k$ of the client associated with a past timing (or vice-versa). In other words, the throughput gradient metric may be given by $Thr_k-Thr_i$. The time i is the current time period (or the most recent time period for which $Thr_i$ is available), while the time period k is a prior time period.

The throughput metrics $Thr_k$ and $Thr_i$ may be based on the throughput of the client during one or more time periods. The throughput of a client during a time period may be estimated by any method. For example, the throughput of the client at time period i may be given by $r_i(1-PER_i)$, where $r_i$ is the PHY rate of the client at time period i and $PER_i$ is the packet-error-rate of the client at time period i. As another example, the throughput of the client at time period i may be given by $D_i/t_i$, where $D_i$ is the amount of user data communicated between the beamformer and the client in a most recent time period and $t_i$ is a duration of the most recent time period.

In certain examples, the throughput metric $Thr_k$ associated with a past timing may be equal to the estimated throughput of a single time period (i.e., the throughput of the $k^{th}$ time period). In other examples the throughput metric $Thr_k$ associated with a past timing may be a statistical aggregation (e.g., average, median, etc.) of throughputs over multiple time periods including or adjacent to the $k^{th}$ time period. For example, the throughput metric $Thr_k$ may be a m-period moving-average throughput at the $k^{th}$ time period, where m is any integer. As another example, the throughput metric $Thr_k$ may be an average throughput over the time periods $t_k$, $t_{k+1}$, ..., $t_{k+m}$. As another example, the throughput metric $Thr_k$ associated with a past timing may be the highest m-period moving-average throughput that has occurred since the $k^{th}$ time period.

In certain examples, the throughput metric $Thr_i$ associated with a past timing may be equal to the estimated throughput of a single time period (i.e., the throughput of the $i^{th}$ time period). In other examples the throughput metric $Thr_i$ associated with a past timing may be a statistical aggregation (e.g., average, median, etc.) of throughputs over multiple time periods including or adjacent to the $i^{th}$ time period. For example, the throughput metric $Thr_i$ may be a m-period moving-average throughput at the $i^{th}$ time period, where m is any integer.

For example, the prior time period k may be a time period associated with a most recently performed sounding operation (e.g., the time period immediately following the sounding). As another example, the time period k may be the time period that is a fixed number of time periods prior to the time period i; in other words, k=i−p, where p is some constant.

As used herein, a wireless throughput has "significantly decreased" if the throughput gradient metric satisfies a pre-specified threshold. For example, if the throughput gradient metric is given by $Thr_k-Thr_i$, then the wireless throughput has "significantly decreased" if $Thr_k-Thr_i$ is greater than (or greater-than-or-equal-to) a threshold value. Thus, for example, the condition (b) may be tested by testing $Thr_k-Thr_i>T$, where T is a specified threshold.

In general, a beamformer (such as the communications device 100) may occasionally collect throughput samples as part of its normal operation, for purposes other than the adaptive sounding process. Such already-existing throughput samples may be used in determining the throughput gradient metric. By leveraging the existing throughput samples, the determining of the throughput gradient metric might impose minimal additional processing requirements on the beamformer.

[Condition (c)—Significant Traffic]

Recall that condition (c) is: the client had a significant amount of recent traffic. Satisfaction of the condition (c) may be determined based on a traffic metric. The traffic metric may be any metric that quantifies an amount of recent traffic for a client. More specifically, the traffic metric may be any metric that quantifies an amount of traffic for the client over a period of time that includes or is adjacent to a current time period. As used herein, the client had a "significant amount" of recent traffic if the traffic metric is greater than (or greater-than-or-equal-to) a pre-specified threshold.

For example, the traffic metric may be given by a moving average of a client's frame size. For example, the traffic metric may be given by the value $\breve{S}_i$.

$$\breve{S}_i = (1-\alpha) \cdot \breve{S}_{i-1} + \alpha \cdot S_i$$

where $S_i$ is the client's frame size (e.g., the Aggregated MAC Protocol Data Unit or A-MPDU) for the $i^{th}$ time period, and $\alpha$ is a specified constant. The constant $\alpha$ may be, for example, ⅛.

As used herein, the client had a "significant amount of recent traffic" if the traffic metric satisfies a pre-specified threshold. For example, if the traffic metric is given by $\breve{S}_i$, then the client had a "significant amount of recent traffic" if $\breve{S}_i$ is greater than (or greater-than-or-equal-to) a threshold value. Thus, for example, the condition (c) may be tested by testing $\breve{S}_i > Q$, where Q is a specified threshold.

In general, a beamformer (such as the communications device 100) may occasionally collect frame size samples as part of its normal operation, for purposes other than the adaptive sounding process. Such already-existing frame size samples may be used in determining the traffic metric. By leveraging the existing frame size samples, the determining of the traffic metric might impose minimal additional processing requirements on the beamformer.

[Example Non-Transitory Machine Readable Medium]

Figure 6:
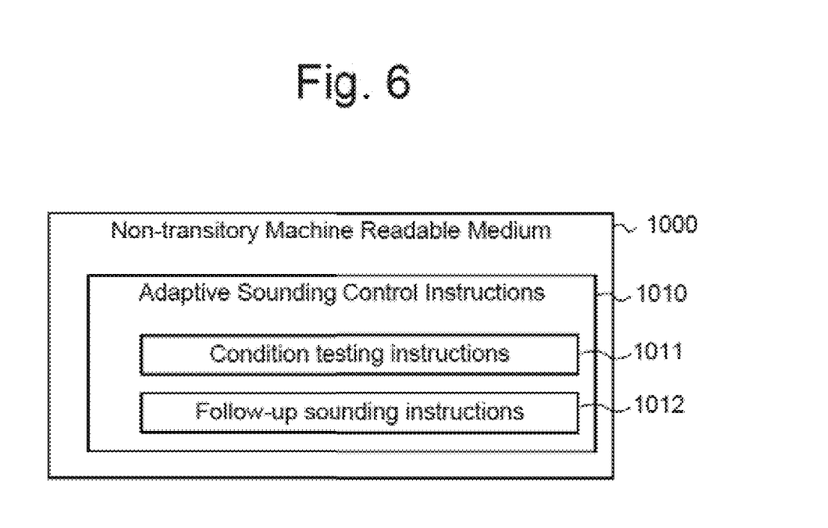
FIG. 6 is a block diagram illustrating an example non-transitory computer readable medium storing example adaptive sounding control instructions.

FIG. 6 illustrates an example non-transitory machine readable medium 1000 that stores adaptive sounding control instructions 1010 that are executable by processing circuitry of a beamformer (such as the processing circuitry 121). The MU adaptive sounding control instructions 1010, when executed, may cause a beamformer to perform any of the example adaptive sounding processes described herein, such as the example processes illustrated in FIGS. 3 and 4. For example, the adaptive sounding control instructions 1010 may include condition testing instructions 1011 and follow-up sounding instructions 1012.

The condition testing instructions 1011 may be to cause the beamformer to periodically test the set of conditions (a)-(c) described above. In particular, the condition testing instructions 1011 may include instructions to determine whether: (a) a wireless channel of the client has significantly changed, as determined based on a channel correlation metric, (b) a wireless throughput has significantly decreased, as determined based on a throughput gradient metric, and (c) the client had a significant amount of recent traffic, as determined based on a traffic metric. For example, the condition testing instructions 1011 may include instructions to periodically test: $\rho(i,j)<R$ (condition (a)), $Thr_k-Thr_i>T$ (condition (b)), and $\breve{S}_i>Q$ (condition (c)). In certain examples, the condition testing instructions 1011 may include instructions to use already existing CSI samples to calculate the channel correlation metric, instructions use already existing throughput samples to calculate the throughput gradient metric, and/or instructions to use already existing frame size samples to calculate the traffic metric.

The follow-up sounding instructions 1012 may include instructions to cause the beamformer to perform a follow-up sounding whenever the conditions (a)-(c) are jointly satisfied, and/or instructions to cause the beamformer to abstain from performing (prevent) follow-up soundings for the client except in response to the conditions (a)-(c) being jointly satisfied.

Throughout this disclosure and in the appended claims, occasionally reference may be made to "a number" of items. Such references to "a number" mean any integer greater than or equal to one. When "a number" is used in this way, the word describing the item(s) may be written with the pluralized "s" for grammatical consistency, but this does not necessarily mean that multiple items are being referred to. Thus, for example, "a number of client devices" could encompass both one client device and multiple client devices.

Various example processes were described above, with reference to various example flow charts. In the description and in the illustrated flow charts, operations are set forth in a particular order for ease of description. However, it should be understood that some or all of the operations could be performed in different orders than those described and that some or all of the operations could be performed concurrently (i.e., chronologically in parallel).

As used herein, 'access point' (AP) generally refers to receiving points for any known or convenient wireless access technology which is now or may later become known. Specifically, the term AP is not intended to be limited to IEEE 802.11-based APs. APs generally function as an electronic device that is adapted to allow devices to wirelessly connect to a network via various communications standards.

While the above disclosure has been shown and described with reference to the foregoing examples, it should be understood that other forms, details, and implementations may be made without departing from the spirit and scope of this disclosure.

What is claimed is:

1. A network device comprising:
a memory;
a processor executing instructions stored in the memory to perform an adaptive sounding process for a client in response to determining that all of the following conditions are jointly satisfied:
(a) a wireless channel of the client measured using a channel correlation metric has changed by a first threshold amount, wherein the channel correlation metric is based on channel state information (CSI) measured at the network device;
(b) a wireless throughput measured using a throughput gradient metric has decreased by a second threshold amount, wherein the throughput gradient metric is based on a difference between a current throughput measure and a prior throughput measure; and
(c) the client's traffic measured using a traffic metric has exceeded a third threshold amount, wherein the traffic metric is based on a moving average of the client's frame size.

2. The network device of claim 1, wherein the adaptive sounding process further includes, for each client connected to the network device, not performing the follow-up sounding for the client whenever any one of the conditions (a) through (c) is not satisfied.

3. The network device of claim 1,
wherein the channel correlation metric quantifies a correlation between CSI samples from two time periods.

4. The network device of claim 1,
wherein the network device is to wirelessly communicate with multiple client devices concurrently via multiple antennas by utilizing a multi-user-multiple-input-multiple-output (MU-MIMO) technique.

5. The network device of claim 1,
wherein the network device is to wirelessly communicate with a single client device via multiple antennas by utilizing a single-user-multiple-input-multiple-output (SU-MIMO) technique.

6. A method comprising:
determining, by a network device, whether (a) a wireless channel of a client measured using a channel correlation metric has changed by a first threshold amount, wherein the channel correlation metric is based on channel state information (CSI) measured at the network device;
determining, by the network device, whether (b) a wireless throughput measured using a throughput gradient metric has decreased by a second threshold amount, wherein the throughput gradient metric is based on a difference between a current throughput measure and a prior throughput measure;
determining, by the network device, whether (c) the client's traffic measured using a traffic metric has exceeded a third threshold amount, wherein the traffic metric is based on a moving average of the client's frame size; and
in response to all of the conditions (a)-(c) being jointly satisfied, performing a follow-up sounding for the client.

7. The method of claim 6, further comprising:
for each client connected to the network device, preventing performance of the follow-up sounding for the client except in response to all of the conditions (a)-(c) being jointly satisfied.

8. The method of claim 6,
wherein the channel correlation metric quantifies a correlation between CSI samples from two time periods.

9. The method of claim 6,
wherein the network device is to wirelessly communicate with multiple client devices concurrently via multiple antennas by utilizing a multi-user-multiple-input-multiple-output (MU-MIMO) technique.

10. The method of claim 6,
wherein the network device is to wirelessly communicate with a single client device via multiple antennas by utilizing a single-user-multiple-input-multiple-output (SU-MIMO) technique.

11. A non-transitory machine-readable medium that stores instructions for an adaptive sounding process that, when executed by a processor of a network device, cause the network device to:
perform the adaptive sounding process for a client in response to determining that all of the following conditions are jointly satisfied:
(a) a wireless channel of the client measured using a channel correlation metric has changed by a first threshold amount, wherein the channel correlation metric is based on channel state information (CSI) measured at the communications device;
(b) a wireless throughput measured using a throughput gradient metric has decreased by a second threshold amount, wherein the throughput gradient metric is based on a difference between a current throughput measure and a prior throughput measure; and
(c) the client's traffic measured using a traffic metric has exceeded a third threshold amount, wherein the traffic metric is based on a moving average of the client's frame size.

12. The non-transitory machine-readable medium of claim 11,
wherein the channel correlation metric quantifies a correlation between CSI samples from two time periods.

13. The non-transitory machine-readable medium of claim 11, wherein the network device is to wirelessly communicate with multiple client devices concurrently via multiple antennas by utilizing a multi-user-multiple-input-multiple-output (MU-MIMO) technique.

14. The non-transitory machine-readable medium of claim 11, wherein the network device is to wirelessly communicate with a single client device via multiple antennas by utilizing a single-user-multiple-input-multiple-output (SU-MIMO) technique.

\* \* \* \* \*